Dec. 10, 1963  W. B. DEAN ETAL  3,113,452
METHOD AND APPARATUS FOR TESTING VEHICLE BODIES
Filed Nov. 14, 1960

INVENTORS.
Walter B. Dean
Henry W. Wessells-III
Benjamin Labaree.
BY Wm. R. Glisson
ATTORNEY United States Patent Office 3,113,452
Patented Dec. 10, 1963

3,113,452
METHOD AND APPARATUS FOR TESTING VEHICLE BODIES
Walter B. Dean, Narberth, Henry W. Wessells III, Ardmore, and Benjamin Labaree, Philadelphia, Pa., assignors to The Budd Company, Philadelphia, Pa., a corporation of Pennsylvania
Filed Nov. 14, 1960, Ser. No. 68,841
11 Claims. (Cl. 73—91)

This invention relates to method and apparatus for testing vehicle bodies, especially for testing unitized body structures but applicable to those having separate load-carrying frames, and has for an object the provision of improvements in this art.

One of the particular objects of the invention is to provide a method and means for obtaining critical and reliable information on the relative movements between body components which cause failure in use, as in road tests; or which may affect ride, comfort, noise, handling, steering or safety; to determine distribution of load reactions; to make possible the determination and study of stresses resulting from use, by realistically applying forces to simulate those occurring in actual use, in the laboratory where detail study can more easily be made.

Another object is to duplicate such service tests in the laboratory under accelerated conditions with the same testing procedure and equipment as were used for service tests.

Another object is to provide method and means which furnish accurate and dependable results.

Another object is to provide results which are easy to analyze and apply to various altered structures thereby providing information of value on new structures even when service tests have not been made.

Another object is to provide a method which is simple requiring only simple equipment and needing very little personal attention during tests; and to provide test equipment which is easy to make, install and use, the basic comparator equipment being mounted wholly on the vehicle under test.

Another object is to provide a test which, while it reproduces stresses of road tests, does not require the body to be in motion and thus permits ready study and analysis of structures.

Another object is to provide a test which limits motion of the body essentially to deflections, thus allowing these deflections to be more easily understood by untrained observers.

Another object is to provide a test which is simple and cheap to install, the equipment required to perform such a test being much simpler and less expensive than is required for dynamic tests.

Another object is to provide that the test rate of a static test is largely independent of the load instead of being determined by the load as in a dynamic test.

The above and other objects and advantages of the invention will be apparent from the following description of an exemplary embodiment, reference being made to the accompanying drawings wherein.

Figure 1:
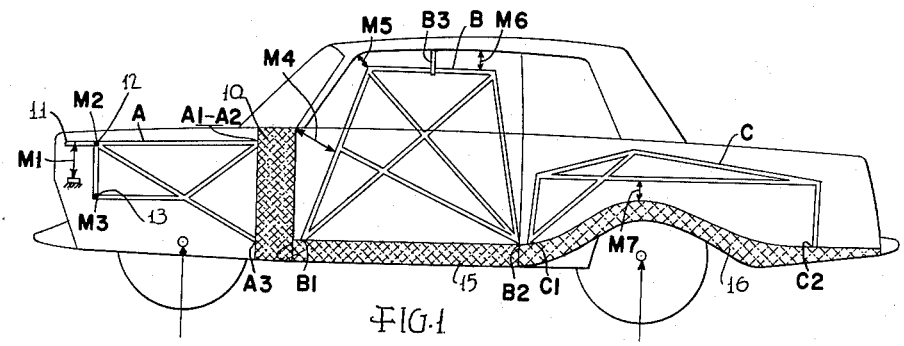
FIG. 1 is a diagrammatic side elevation of a unitized automobile body construction with test equipment installed for service or laboratory testing.
Figure 2:
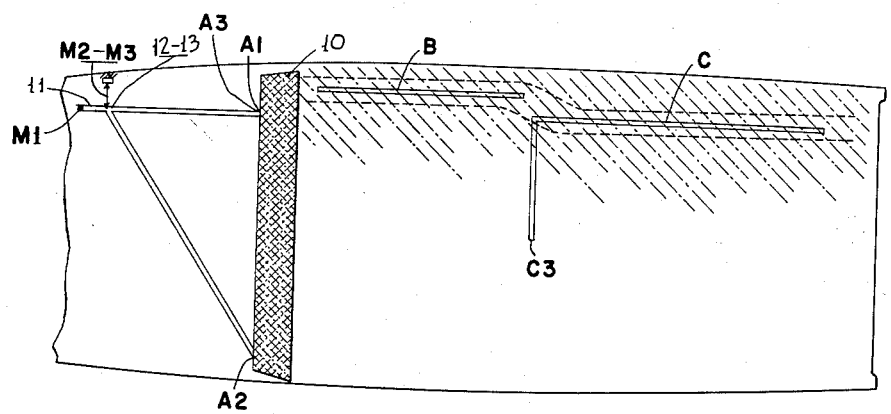
FIG. 2 is a plan view of the same.

Heretofore it has been usual to test vehicle bodies by accelerometers and strain gages applied locally to the structure or to measure loadings at points of load application, as at shock absorbers, spring shackles, suspension elements and the like.

Accelerometers are highly unreliable for measuring road test reactions; and strain gages applied to body sheet metal also give misleading information due to the difficulty of distinguishing between strains caused by imposed loads and strains due to secondary deflections in individual panels.

The method of obtaining measurements through load application points gives better results than are obtainable through locally applied accelerometers or strain gages, but the distribution of body reactions under accelerative forces remains unknown. This distribution of body reactions under accelerative forces is important in determining stresses and deflections in indivdual parts of the body; and it is necessary to know both the input forces and inertia forces.

According to the present invention, measurements in service, as in road tests, are taken of the relative movements between parts, i.e. the deflections of parts measured by reference to other parts, at critical points of the vehicle body. These deflections are duplicated in the test plant or laboratory and provide a basis for load application in fatigue tests.

Applying the invention specifically to an automobile body, previous tests have indicated that the zones of importance are: (1) the front end relative to the cowl, (2) the door frame or frames relative to a side sill; and (3) the floor pan and rear side sill kickup over the rear axle relative to the rear side sill fore and aft of the kick-up location.

To measure relative deflections in the critical areas, rigid frames are secured to stable structures; and at points distant from the stable anchor points, measurements are taken between the rigid frame and the adjacent body part.

These measurements can be made by various known devices. For a steady-state condition, mechanical micrometer length measuring gages or extensometers can be used. For rapid movements, various known devices, such as differential transformers (some are known commercially as "Microformers,") variable rheostats or the like, with multi-channel recorders, can be used.

The drawings show diagrammatically the application of test equipment to a two-door sedan. This is merely illustrative and does not in any way limit the test apparatus and procedure to this particular type of vehicle.

The cowl structure 10 is one substantially fixed reference base relative to which front end movements may be measured. A rigid light frame A is mounted at pivot points A1 and A2 in a horizontal line and at A1 and A3 in a vertical line, the point A1 being common to both lines. The front end of the frame A is cantilevered to stand at a considerable distance forward of the cowl, clearing the motor and related parts, and is provided with a plate 11 to cooperate with a micrometer measuring device, such as a microformer M1, which is carried by the sheet metal in the region of the forward side sill to indicate vertical deflections. The microformers in all cases are indicated by lines with arrows at each end, microformers being so well known that no further illustration is believed to be needed. For the details and operation of differential inductance devices of this type see Hornfeck 2,420,539, MacGeorge 2,451,757 and others. Other microformers M2 and M3 are mounted on the sheet metal near the side sill in a position to be engaged by plates 12 and 13 carried by the frame A to measure transverse deflections. It is noted that when the frame is cantilevered, as here, the instruments, though light, are kept off the frame, which carries only the actuating plates.

The side sill 15 at the door provides a good reference base for measuring deflections around the door; and a light rigid frame B is mounted at pivot points B1 and B2 on the side sill. The frame is stabilized laterally at the top by a connection B3 which holds the lateral position of the frame while not restricting relative movements between the test frame B and the adjacent sheet metal structure in other directions.

A microformer M4 measures movements on a diagonal at the bottom of the windshield or inside instrument panel relative to the frame B. A microformer M5 measures movement on a diagonal relative to the top front portion of the door frame or A post. And a microformer M6 measures movements vertically further back in the door to the roof side sill. If the instruments here are mounted on the test frame their weight will not appreciably affect results since the weight is carried in a plane above the base supports and not cantilevered as was the case in the front installation.

The side sill 16 at the rear provides a good reference base for measuring deflections at the rear axle kickup; and a light rigid frame C is mounted at pivot points C1 and C2 on the rear side sill. The frame is stabilized laterally at the front end by a connection C3 to a rigid transverse portion or seat riser of the floor pan.

A microformer M7 measures vertical deflections at the top of the kickup on the rear side sill.

Exemplary forms of test frames have been described. The exact nature of the installation will depend on the construction of the particular car body to be tested. In some cases the trunk is entirely separated from the passenger area. Suspensions using other than semi-elliptic rear springs, and rear engine cars, may require different installations to measure different deflections. In all cases the front end sheet metal and front door opening will probably remain the most important areas.

The test frames are strong but light and are so mounted that they do not substantially affect the deflections being measured. This is due to their lightness, inherent stiffness and being mounted on rigid base supports. In testing, small deflections can be detected in the test frames but at an identifiable frequency which is different from any of the car body frequencies to be measured, hence the affect of the test frames can be disregarded.

The differential transformers or "microformers" are protected by light metal casings (as of aluminum) and are held in position by clamps providing ready adjustment of position.

Accelerometers may also be used for reference purposes. One may be located on the front wheelhouse forward of the front wheel center; one may be located on the trunk floor behind the rear wheel center; and one may be located under the front seat at the center of gravity of the car. The front and rear accelerometers measure vertical accelerations and the center one measures lateral accelerations.

In order to illustrate the application of the invention it will be assumed that a car equipped with the test apparatus is run on the proving grounds.

Preliminary analyses indicate that some of the road conditions are extremely important in the fatigue test deflection pattern and that others are negligible. Important conditions include ripples, potholes, cobblestones, sharp turns, and steep grades.

Following preliminary inspection of a set of records, key points in the oscillograph records are laid out for measurement according to the calibration curves of the differential transformers. Deflections of the body at peak load conditions on the important parts of the course are then measured.

By means of time studies made at the proving grounds, it is possible to calculate the repetitions of deflection to the full endurance course, based on the short runs on the oscillograph records. The amplitude of deflections, frequency, total number of repetitive deflections, and the phase relationship of the deflections for the proving ground records are studied.

It has been found in a typical case which is used as an illustration that the pothole bump is the most important item in the endurance cycle, particularly when considering a fatigue test of an accelerated form. By comparison with potholes, the deflections occurring on the other sections of the test course are relatively small. Furthermore, the pothole deflection traces contain all the elements of deflections of less severe sections of the test course.

For this reason, a laboratory fatigue test based on pothole deflections, gives quick and realistic results and can be easily designed and performed.

Based on measured deflection data, it would be possible to determine by trial the necessary loads to reproduce these deflections. While an empirical approach can be used to determine the loads applied to the particular car under test, it has the disadvantage of being limited in accuracy if applied to a car of different weight, stiffness or suspension.

It is therefore necessary to make a rigorous analysis of the motions of the car and its suspension when hitting a bump and to calculate the reactive forces on the body. Such an approach is valid for determining loads in any car; and the resulting deflections can be compared with road test deflections as a check. The resulting mathematical model, which may be checked by empirical data, is then applicable to any car which might be designed and tested.

In order to make a mathematical model of the car and its suspension system, a number of realistic assumptions are made, based on available data for the car. Since the points of support of the body are known, since the deflections at various critical points in road tests are available; and since the deflections were measured at these points during road tests and recorded against time, it is possible to determine the timing and extent of motion to be imparted in the laboratory to duplicate the road tests.

Figure 3:
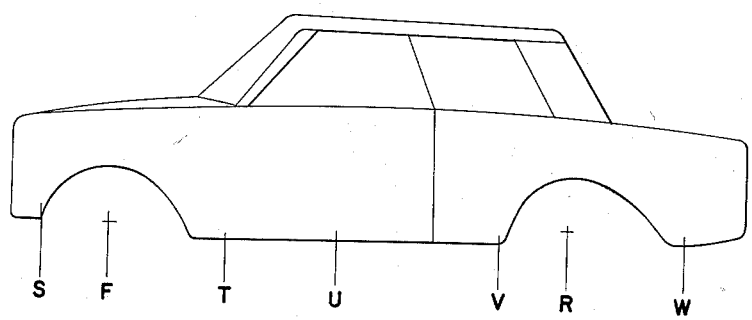
FIG. 3 is a diagram in elevation to show load applications to a body in the testing laboratory.

FIG. 3 represents the points of securement and points of force application on a body.

The line F represents the front securement point and the line R represents the rear securement point, these corresponding to the front and rear axles with spring deflections accounted for and dropped out. Side twist is applied at these locations, as by tilting the supports, and taken into account in the load applicators; but these details need not be specifically explained here.

Lines S, T, U, V and W represent the approximate points of load application for close simulation of the loads imposed on the test track run.

It will be seen that the line S is located at the front engine mount; the line T is located at the rear engine mount; the line U is located at the front seat; the line V is located at the rear seat; and the line W is located where the trunk load is concentrated. These loads also represent the body reactive masses: that at S includes front sheet metal; at T, the cowl, at U, the floor and doors; at V, the quarter panel; and at W, the rear sheet metal.

There may be other points of load application but the ones described above should be sufficient to illustrate the principles of the invention.

With the test laboratory arrangement described and the frames A, B, and C and related equipment installed as for the road tests, runs are made and recorded; and these records are compared with road test records.

It has been found that for the critical conditions, the laboratory test records so closely match the road test records that they appear to be duplicates. Also failures occur in the same locations and at about the same number of cycles as in road tests.

The validity of the tests has also been established by the reverse procedure. That is, a new structure which had not been road tested was first tested in the laboratory and the structure later tested on the road. It was found that failures, in location and time, were again approximately duplicated.

While proving ground and road tests remain essential and cannot be entirely replaced by any sort of laboratory tests, the fatigue tests outlined herein form a very important supplement to such road tests and offer distinct advantages over them, two important advantages being the saving in time and the saving of expense, both very large items in any test program. The laboratory test, which is shown to have excellent correlation with actual use, permits rapid and low cost evaluation of design changes.

In many cases it is possible to incorporate detail changes in a car already on the test stand and to obtain test results in a fraction of the time normally required. Even in the case of prototype cars, it is possible to evaluate a new design in much less time than is normally required for road testing. This is particularly important in designing lightweight structures in which initial failures are expected to occur and in which corrections will be required.

Of equal importance in design work is the evaluation of existing structures, leading to a better understanding of component requirements.

Because of its nature, the laboratory fatigue test permits close observation of local deflections. Although the test is not intended to simulate exactly actual frequencies, it does approximate them. In this method, body forces and reactions are reversed from the actual road conditions. In the test, forces (loads) are applied at certain points of the body to simulate reactions due to accelerations of the body. The reactions to these applied forces are taken at the wheels, where in actual practice the external forces are applied to the car. By thus transposing the external forces and the reactions, the car body remains stationary during the test. In this respect, this test method is unlike any of the commonly used dynamic methods which may be used for simulating road tests. In the dynamic tests, forces are applied to the wheels and reactions act on the body due to acceleration as in actual operation. Such tests require motion of the body and application of loads at the exact rate which occur in driving. In the test method which is described in this application, since the forces and reactions are transposed, no body motion is necessary and the rate of application is independent of the force. Therefore, the only motions occurring in the body are due to deflections of the body structure. This permits observation and analysis of structural behavior and conditions such as deflections, drumming, buckling, joint movements and the like, which are extremely difficult or impossible to study, especially by untrained observers, during operation. Furthermore, the inception and development of failures are readily observable, whereas in road tests they cannot usually be observed and can be deduced only after failure. It is therefore possible to observe various conditions, such as panel deflections, drumming, buckling, joint movement, and the like, which are extremely difficult or impossible to study during road tests. Furthermore, the initiation and development of failures are readily observable; whereas in road tests they cannot usually be observed and can be deduced only after failure.

While one embodiment of the invention has been described for purposes of illustration, it is to be understood that there may be various embodiments and modifications within the general scope of the invention.

What is claimed is:

1. The method of testing vehicle body structures, which comprises, securing a light rigid frame to a stable rigid part of the body, providing a deflection measuring device between a part of the frame distant from the rigid body part on which the frame is mounted and a distant body part, wracking and vibrating the body to induce distortions in said body, and measuring deflections between the frame and an unstable rigid part on said body by said measuring device at a point distant from the point of securement of the frame to the body.

2. The method of testing vehicle body structures, such as an automobile body having a rigid cowl base, rigid side sill bases forming door sills, and having rigid side sill bases at the rear axle kickup region, which comprises, securing a light rigid frame to at least one of said rigid bases, providing a deflection measuring device between a part of the frame distant from a rigid body base on which a frame is mounted and a distant part of the body, wracking and vibrating the body, and measuring deflections between the frame and body by said measuring device at a point distant from the point of securement of the frame to the body.

3. The method as set forth in claim 2, further characterized by the fact that the body is wracked in road tests and subsequently wracked in a laboratory to substantially duplicate the road test movements.

4. The method of testing vehicle body structures, which comprises, securing a light rigid frame to a stable rigid part of the body, providing a deflection measuring device between a part of the frame distant from the rigid body part on which the frame is mounted and a distant body part, running a car with the body in road tests and making a time-amplitude record of the body deflections by said measuring device at a point distant from said point of securement, mounting the body in a test plant and applying load application forces at points of and of proper amplitude to substantially duplicate the road test record, and continuing the load application forces until failure occurs.

5. The method of testing vehicle bodies for wrack and vibration which comprises, securing on a stable portion of the body a rigid test frame having a part distant from its point of securement disposed adjacent another portion of the body; operating the vehicle on a test track and making a record of movement between said distant frame part and the adjacent body portion; mounting the body in a laboratory with supports approximately where loads were applied on the test track; securing the test frame in the same position as before; applying loads to the body at points spaced from the points of support and selected in position and amplitude to approximately duplicate the test track record; and continuing the laboratory test to determine fatigue resistance of the body portion.

6. The method as set forth in claim 5, wherein the vehicle body tested is an automobile body with a rigid cowl, further characterized by the fact that the rigid frame is secured to the cowl structure as a base and has its distant portion disposed near the front end sheet metal.

7. The method as set forth in claim 5, wherein the vehicle body tested is an automobile body with a rigid cowl and a rigid front door sill, further characterized by the fact that one rigid frame is secured to the cowl structure as a base and has its distant portion disposed near the front end sheet metal; and that another rigid frame is secured to the door sill as a base and has its distant portion disposed near the top of the door.

8. The method as set forth in claim 5, wherein the vehicle body tested is an automobile body with a rigid cowl, a rigid door sill, and a rigid rear side frame, further characterized by the fact that one rigid frame is secured to the cowl as a base and has its distant portion disposed near the front end sheet metal; that another rigid frame is secured to the door sill as a base and has its distant portion disposed near the top of the door; and that another rigid frame is secured to the rear side frame as a base and has its distant portion disposed near the sheet metal above the rear kickup.

9. Apparatus for testing a vehicle body having interconnected rigid body portions and suspended parts having movement relative thereto, comprising in combination, a light rigid base frame rigidly attached to a rigid body portion as a base connection, an extension frame rigidly attached to said base frame and having a distant portion disposed near the rigid portion of said body supporting said suspended parts, and means for measuring relative movements between the distant portion of the extension frame and the rigid portion of said body supporting said suspended parts.

10. Apparatus for testing an automobile body having a rigid cowl and front end sheet metal at a distance forward of the cowl having movement relative to the cowl, a light rigid cantilever frame secured to said cowl as a base and having its distant portion disposed adjacent the front end sheet metal, and means for measuring movements between said distant frame portion and the adjacent sheet metal.

11. Apparatus for testing an automobile body having a rigid cowl base, a rigid side sill base at a door sill, and a rigid rear side sill base at a rear axle kick-up location, comprising a light rigid frame secured to at least one of said rigid bases, and means for measuring relative movements between a part of said frame distant from said base and an adjacent body part.

References Cited in the file of this patent

UNITED STATES PATENTS

| | | |
|---|---|---|
| 2,799,158 | Federspiel | July 16, 1957 |
| 2,933,715 | Beuermann | Apr. 19, 1960 |